United States Patent [19]

Ball et al.

[11] Patent Number: 5,480,561
[45] Date of Patent: Jan. 2, 1996

[54] METHOD AND APPARATUS FOR TREATING WASTEWATER

[75] Inventors: Harold L. Ball, Roseburg; Eric S. Ball, Winchester; Jeffrey L. Ball; Terry R. Bounds, both of Roseburg, all of Oreg.

[73] Assignee: Orenco Systems, Inc., Roseburg, Oreg.

[21] Appl. No.: 267,316

[22] Filed: Jun. 28, 1994

[51] Int. Cl.$^6$ ................................................ C01D 37/04
[52] U.S. Cl. ......................... 210/744; 210/97; 210/195.1; 210/196; 210/804; 210/805
[58] Field of Search .................................. 210/86, 195.1, 210/195.2, 196, 257.1, 257.2, 944, 804, 805, 806, 97

[56] References Cited

U.S. PATENT DOCUMENTS

| | | | |
|---|---|---|---|
| 2,441,813 | 5/1948 | Halvorson | 210/605 |
| 2,772,235 | 11/1956 | Bookout et al. | 210/196 |
| 3,713,543 | 1/1973 | Heaney | 210/196 |
| 4,689,153 | 8/1987 | Follmann et al. | 210/195.2 |
| 4,784,771 | 11/1988 | Wathen et al. | 210/195.2 |
| 4,818,384 | 4/1989 | Mayer | 210/86 |
| 5,269,911 | 12/1993 | Stegall, Sr. et al. | 210/257.1 |
| 5,282,972 | 2/1994 | Hanna et al. | 210/257.2 |

FOREIGN PATENT DOCUMENTS 2327111 12/1974 Germany ................................ 210/196

*Primary Examiner*—Joseph W. Drodge
*Assistant Examiner*—Kenneth M. Jones
*Attorney, Agent, or Firm*—Chernoff, Vilhauser, McClung & Stenzel

[57] ABSTRACT

An improved method and apparatus for treating wastewater in a recirculating filter is disclosed. Solids are removed from the wastewater by gravitational separation and the wastewater is flowed to a tank. At least a portion of the wastewater is flowed from the tank to a filter comprised of filter media and flowed through the media to produce a filtrate. The amount of wastewater in the tank is sensed. When the amount of wastewater sensed is at least a predetermined amount, a fraction, less than all but more than none, of the filtrate is returned to the tank. When the amount of wastewater is less than the predetermined amount, more than the fraction of filtrate is returned to the tank by decreasing resistance to flow of the filtrate to the tank. The apparatus includes a tank and a filter interconnected by a conduit for conducting liquid from the tank to the filter. A conduit assembly interconnects a filter outlet and a discharge conduit for conducting liquid from the filter to the discharge conduit. The conduit assembly includes a shunt conduit connected to the tank for shunting at least some liquid from the filter to the tank bypassing the discharge conduit by selectively varying resistance to flow of liquid in the shunt conduit.

4 Claims, 2 Drawing Sheets

5,480,561

1

METHOD AND APPARATUS FOR TREATING WASTEWATER

BACKGROUND OF THE INVENTION

This invention relates to wastewater treatment, and more particularly to an improved method of treating wastewater in a recirculating filter.

A septic tank system that includes secondary treatment of septic tank effluent prior to its on-site disposal provides treatment of wastewater in locations where soil conditions are not suitable for subsurface disposal of septic tank effluent. A recirculating sand filter is a popular choice for providing secondary treatment for the septic tank effluent because it is relatively inexpensive and moderately easy to retrofit, requires only semi-annual routine maintenance at moderate costs, and produces a fairly high quality effluent for on-site disposal.

In a conventional septic tank system including a recirculating sand filter, wastewater flows from a house to a septic tank for gravitational separation of solids from the liquid portion of the wastewater. The liquid portion of the wastewater is conducted from the septic tank to a recirculation tank where it mixes with filtrate returned by gravity from a sand filter. A pump controlled by a timer pumps the liquid from the recirculation tank into a distribution manifold in the sand filter. The liquid passes through the sand filter and is collected as filtrate. The filtrate is conducted through a conduit where, typically, a valve operates so that the liquid filtrate is either returned to the recirculation tank or it is discharged from the system for final disposal. During periods of zero flow of liquid wastewater from the septic tank to the recirculation tank, the valve typically operates to return all the sand filter filtrate to the recirculation tank to dilute the liquid already present there. When wastewater flows from the septic tank to the recirculation tank the liquid level in the recirculation tank rises. When the liquid in the recirculation tank reaches a predetermined level the valve operates so that none of the filtrate is returned to the recirculation tank. Instead, all the filtrate is discharged to disposal. However, the dilution of the liquid in the recirculation tank by the return of filtrate from the filter is necessary to maintain the biological state of the recirculation tank. In addition, during periods of heavy system usage, it is possible that liquid is circulated only once through the sand filter before being discharged for final disposal. Liquid which has passed only once through the sand filter has significantly poorer quality than liquid circulated more than once through the sand filter and will not meet the desired quality of the disposal system.

Orenco Systems, Inc. of Roseburg, Oreg. sells a septic tank system including a recirculating sand filter. In this system, the sand filter filtrate is directed to a flow splitter basin 1 (FIGS. 1 and 2). The basin 1, sized to match the flow capacity of the septic tank, typically has a diameter of 21 to 30 inches. Two orificed conduits 2, 3 located at the bottom of the basin act as drainage conduits, each conduit having a cap 4 at one end. The first conduit 2 is connected to the recirculation tank. The second conduit 3 is connected to a discharge line 9 for discharge of liquid from the system. An overflow pipe 8 is attached to each conduit 2, 3. An electrically actuated shut-off valve 5 is located on the discharge line 9. Sand filter filtrate enters the basin 1 through a conduit 6 and flows through the orifices 7 into the conduits and is conducted through the first conduit 2 to the recirculation tank and through the second conduit 3 to discharge

2 from the system. The volume of flow through each conduit is determined by the relative number and size of the orifices in each conduit. The shut-off valve 5 on the discharge line 9 is actuated by a low level of liquid in the recirculation tank to eliminate flow of liquid through the second conduit to discharge. However, the flow splitter basin with orificed conduits cannot-be used without its associated energy-consuming electrical components.

Mayer U.S. Pat. No. 4,818,384 discloses a septic tank system with a recirculation tank receiving discharge from a septic tank and filtrate from a recirculating sand filter. A conduit conducting filtrate from the sand filter to the recirculation tank includes a float valve which closes during periods of heavy system usage and prevents any filtrate from entering the recirculation tank. However, the system cannot operate at peak efficiency under heavy usage conditions because none of the sand filter filtrate is available to dilute the liquid in the recirculation tank.

Halvorson U.S. Pat. No. 2,441,813 discloses a method and a system of treating wastewater by first removing settleable solids from the wastewater in a primary settling tank and transferring the liquid portion of the wastewater from the settling tank to a reservoir. A small portion of the liquid in the reservoir is continuously withdrawn and supplied to an aerobic trickling filter. Filtrate may be returned to the reservoir or diverted to a final settling tank prior to discharge from the system. However, the volume of liquid returned to the reservoir does not depend upon the amount of wastewater present in the reservoir.

Thus, there is still a need for a simple and economical system for treating sewage wastewater in a septic tank system that includes a recirculating sand filter which maintains the biological state in the recirculation tank under all flow conditions from the septic tank.

SUMMARY OF THE INVENTION

The problems associated with a conventionally operated septic tank system that includes a recirculating sand filter are addressed in the present invention by providing an improved method and apparatus for returning filtrate to a tank receiving both filtrate from a filter and liquid wastewater from a septic tank.

Solids are removed from sewage wastewater by gravitational separation, and the wastewater is then flowed to a tank. At least a portion of the wastewater is flowed from the tank to a filter comprised of filter media and then flowed through the media to produce a filtrate. The amount of wastewater in the tank is sensed. A fraction, less than all but more than none, of the filtrate from the filter is returned to the tank when the amount of wastewater sensed in the tank is at least a predetermined amount. More than the fraction of filtrate from the filter is returned to the tank when the amount of wastewater sensed in the tank is less than the predetermined amount by decreasing resistance to flow of the filtrate to the tank. Thus, by the method of the present invention the fraction of filter filtrate returned to the tank depends on the volume of liquid present in the tank. Filtrate is available to dilute the contents of the tank under all flow conditions from the septic tank. Little or no filtrate will be discharged after passing through the filter only once, thus maintaining the quality of the liquid finally discharged from the system.

The system for treating sewage wastewater includes a tank having a tank outlet, a filter comprising filter media and having a filter inlet and a filter outlet, a conduit interconnecting the tank outlet and filter inlet for conducting liquid from the tank to the filter, a discharge conduit for discharging liquid from the system and a conduit assembly interconnecting the filter outlet and the discharge conduit for conducting liquid from the filter to the discharge conduit. The conduit assembly includes a shunt conduit connected to the tank for shunting at least some liquid from the filter to the tank bypassing the discharge conduit. Resistance to flow of liquid in the shunt conduit is selectively varied. This system provides a low maintenance, reliable and economical system for treating sewage wastewater.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 3:
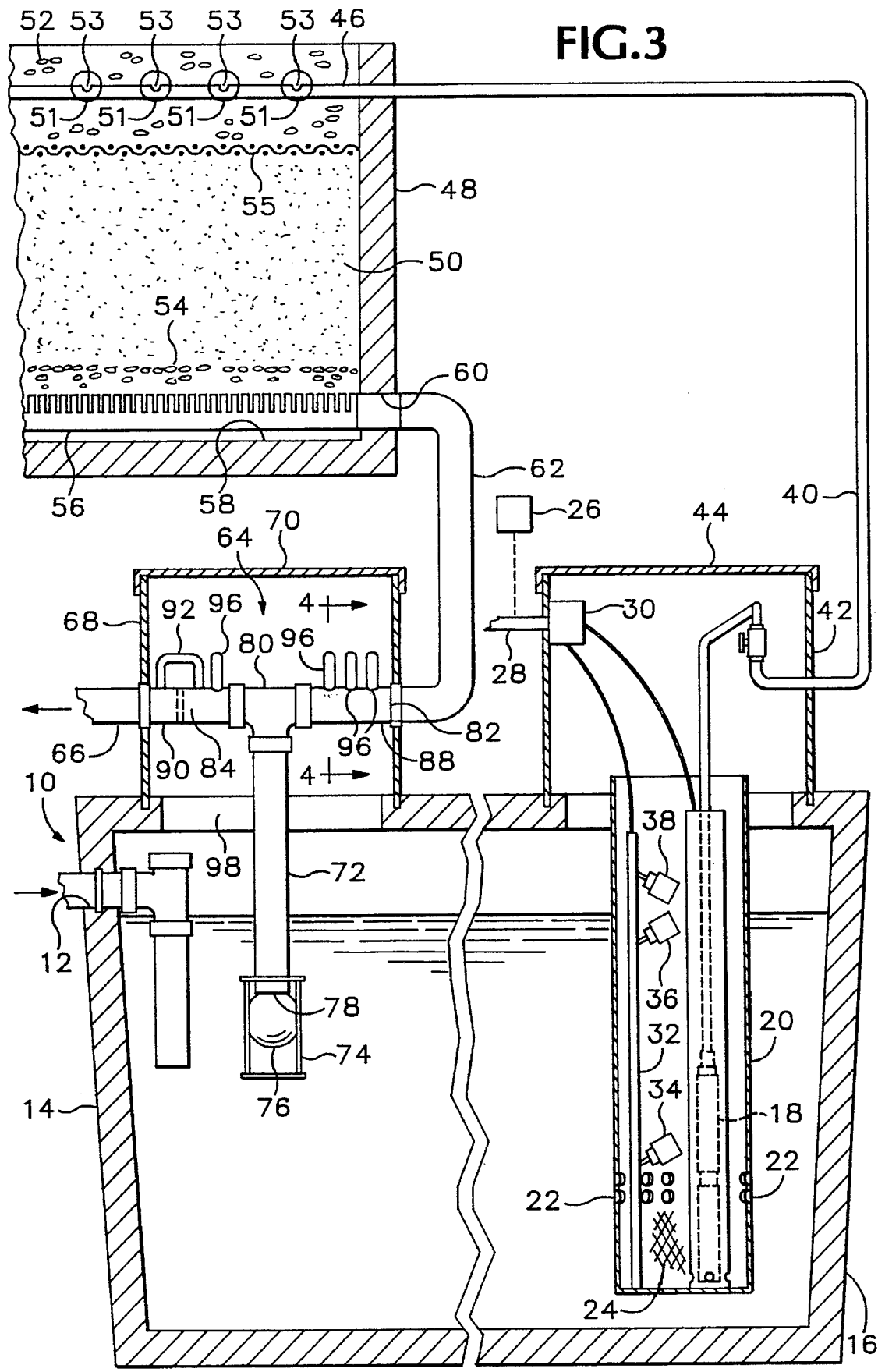
FIG. 3 is a sectional side view of apparatus including a filter and a tank for treating wastewater embodying the present invention, shown with portions of the apparatus broken away.

Referring now to an exemplary embodiment illustrated in FIG. 3, a tank 10, referred to herein as a recirculation tank, receives a liquid wastewater portion of sewage wastewater, the solids in the wastewater having been previously removed by gravitational separation, typically in a septic tank (not shown). The size of the recirculation tank 10 is typically determined by the size of the residence the system will serve. For example, the septic tank and recirculation tank for a two bedroom home typically each have a capacity of 1000 gallons with a design flow capacity of 450 gallons a day.

The recirculation tank 10, which may be made of any suitable material such as fiberglass or concrete, receives the liquid wastewater through an inlet 12 located at one end 14. Proximate a second end 16 of the recirculation tank 10, a pump 18 is located in a cylindrical housing or vault 20 which includes an encircling horizontal row of apertures 22 in the vertical wall of the vault. Nested in spaced relationship in the vault 20 is a filter 24 or screen. This pumping assembly is described in more detail in U.S. Pat. No. 4,439,323 to Ball which is hereby incorporated by reference.

A control panel 26 controls the operation of the pump 18 through an electrical conduit 28 connected to a splice box 30 in response to a float assembly 32 which includes a redundant off/low level alarm float 34, a timer override/on float 36 and a timer override on/alarm float 38. When activated, the pump 18 pumps liquid from the recirculation tank 10 through a conduit 40. The conduit 40 exits a riser 42 having a lid 44 which also contains the splice box 30 and provides access to the screened vault 20.

The conduit 40 is connected to a distribution manifold 46, of suitable size and material, located in a filter 48. The filter 48 contains a filter media which is composed of particulate media, having at least one media support layer 50 suitable for the support and growth of aerobic organisms. One such suitable media is sand having an effective size about equal to 0.6 mm and a uniformity coefficient less than 3. Other particulate materials may also be used as the media support layer, including beads or pellets of polymeric material such as polystyrene, polypropylene, or polyethylene. The layer 50 of particulate media suitable for the support of aerobic organisms is generally located between two layers, a top layer 52 and a bottom layer 54, of particulate media such as pea gravel, each of the two layers having a different, generally larger, effective particle size than the media support layer. The distribution manifold 46 is preferably embedded in a particulate media layer, and most preferably is located in the approximate center of the layer 52 located above the layer 50 of particulate media suitable for the support of the aerobic organisms. An orifice shield 51 shields each distribution orifice 53 in the distribution manifold 46 from the particulate media in which it is embedded. A mesh screen 55 is located immediately above the media layer 50 suitable for the support of aerobic organisms.

A slotted underdrain 56 is located proximate the bottom 58 of the filter 48. The underdrain 56 has a cap (not shown) at one end and is connected at a filter outlet 60 to a filter outlet conduit 62. A conduit assembly 64 located proximate the first end 14 of the recirculation tank 10 interconnects the filter outlet conduit 62 and a discharge conduit 66 for discharging liquid from the system.

Figure 1:
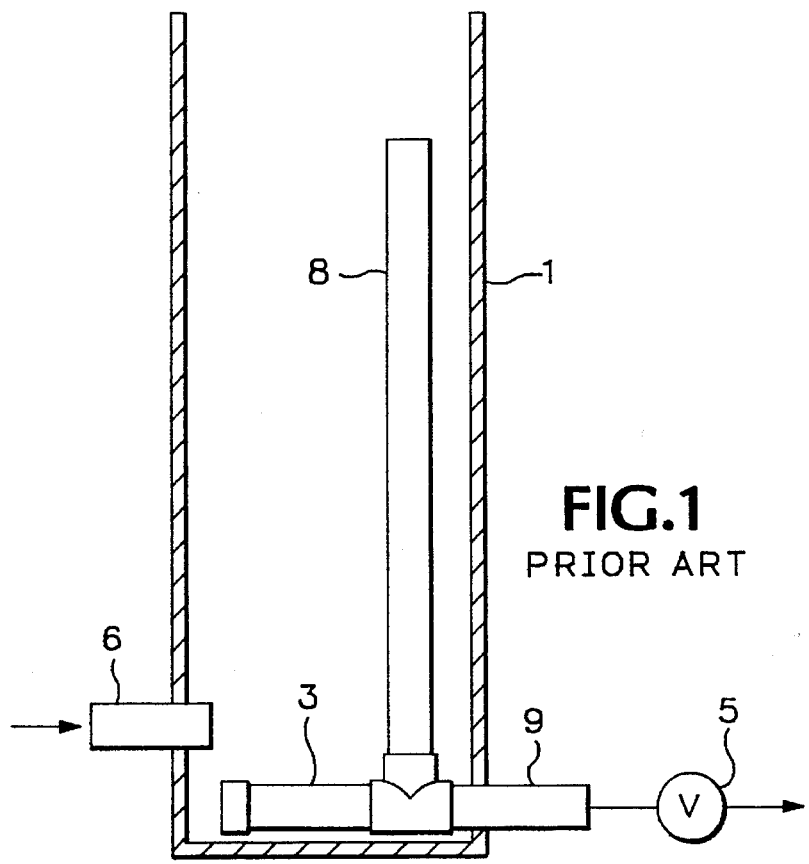
FIG. 1 is a sectional view of a portion of a prior art system for treating wastewater.
Figure 2:
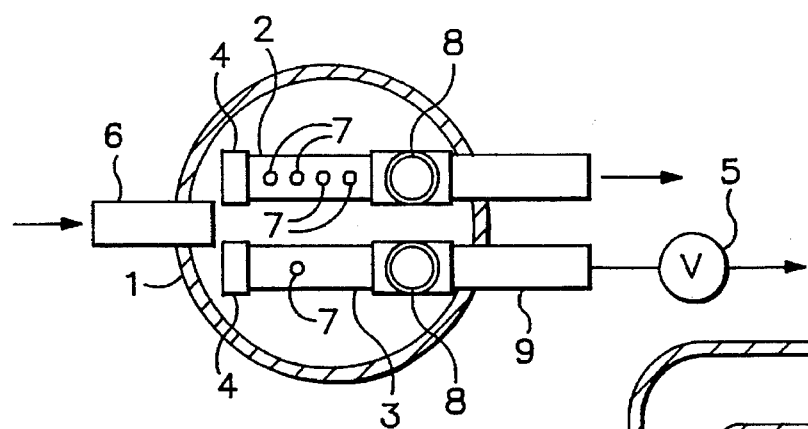
FIG. 2 is a top plan view of the apparatus shown in FIG. 1.
Figure 4:
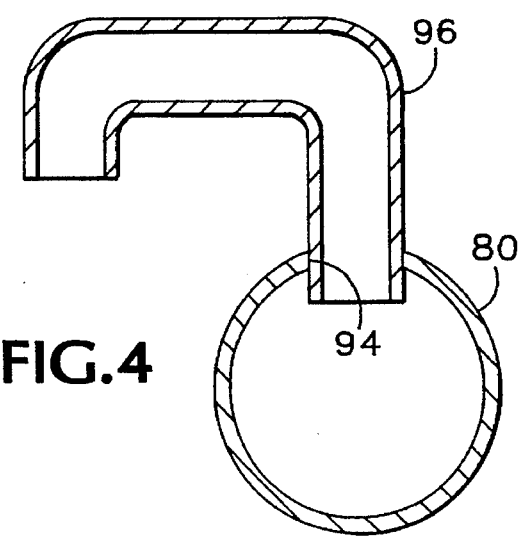
FIG. 4 is an enlarged sectional view taken along line 4—4 of FIG. 3.

The conduit assembly 64 is located in a riser 68 having a lid 70 and includes a shunt conduit 80 having an inlet end 82 connected to the filter outlet conduit 62 and an outlet end 84. A conduit assembly outlet 90 is connected to the discharge conduit 66. The shunt conduit 80 defines a series of orifices 94, each connected to a properly sized outlet pipe 96 (FIG. 4). Each outlet pipe 96 conducts liquid into the recirculation tank 10 through an opening 98 in the tank. A conduit 92 interconnects the conduit assembly outlet 90 and the outlet end 84 of the shunt conduit 80. The shunt conduit 80 is connected by a conduit 72 to the recirculation tank 10. Conduit 72 connects to a float housing 74 that contains a ball float 76 which cooperates with a valve seat 78.

In operation, wastewater flows to a septic tank (not shown) where solids are removed by gravitational separation, and then to a recirculation tank 10. The pump 18 pumps wastewater from the recirculation tank 10 through the conduit 40 to the distribution manifold 46 and into the filter 48. The wastewater flows through each distribution orifice 53 into the orifice shield 51, downwardly by gravity through the layer 52 of pea gravel to the mesh screen 55 which helps distribute the wastewater evenly, and from which the wastewater is wicked into the layer 50 of sand. In the filter, additional particulate matter and biodegradable material are removed from the wastewater by a combination of mechanical filtration and aerobic biological activity to produce a filtrate. As the wastewater passes through the filter media 50, the biological activity of aerobic organisms supported by the media degrades organic material present in the wastewater. Larger particles present in the wastewater become trapped in interstices between media particles. As it collects at the bottom 58 of the filter 48, the filtrate flows into the slotted underdrain 56 located in the layer 54 of pea gravel, through the filter outlet 60 into the filter outlet conduit 62, and into the conduit assembly 64 located proximate the first end 14 of the recirculation tank 10.

The flow of filtrate through the conduit assembly 64 is controlled by selectively varying resistance to the flow of liquid in the shunt conduit 80. The amount of wastewater and the total liquid level in the recirculation tank 10 is sensed by the ball float 76. When the liquid level in the recirculation tank 10 rises sufficiently, the ball float 76 approaches the valve seat 78. As the liquid level continues to rise, the ball float seats and flow through the conduit 72 is thereby prevented. Resistance to flow of liquid through the shunt 80 is increased. Filtrate flowing into the conduit assembly 64 at the inlet end 82 of the shunt conduit 80 fills the conduit 72 and the shunt conduit 80, and flows through conduit 92, from the outlet end 84 of the shunt conduit 80 to the conduit assembly outlet 90, into the discharge conduit 66. With the shunt conduit 80 filled with filtrate, a fraction of the filtrate is conducted through each orifice 94 and outlet pipe 96 through the opening 98 and into the recirculation tank 10, bypassing the conduit 92 and the discharge conduit 66. When the liquid level in the recirculation tank falls sufficiently the ball float 76 unseats from the valve seat 78, thereby decreasing resistance to flow of filtrate through the shunt conduit 80. Resistance to flow in the shunt conduit 80 is at a minimum, and all the filtrate is returned to the recirculation tank through conduit 72, thereby maintaining a minimum liquid level in the recirculation tank 10.

When the amount of wastewater and the liquid level in the recirculation tank is at least a predetermined amount, and the ball float 76 is seated in the valve seat 78, the ratio of the volume of filtrate discharged through the discharge conduit 66 and the volume of filtrate returned to the recirculation tank depends on the number and size of the orifices 94 in the shunt conduit and the size of the conduit 92. For example, referring to FIG. 3, if each orifice 94 and the conduit 92 have approximately equal effective diameters, when the ball float 76 is seated in valve seat 78 and resistance to flow of liquid in the shunt conduit 80 is at a maximum, about 80% of the filtrate will be returned to the recirculation tank 10 through outlet pipes 96, and about 20% of the filtrate will flow through the conduit 92 to be discharged from the system through the discharge conduit 66. Thus, even during periods of peak flow of wastewater from the septic tank, the desired fraction of filtrate can be returned to the recirculation tank 10 to ensure a dilution of incoming septic tank effluent in order to maintain the optimum biological conditions in the recirculation tank.

Varying resistance to flow of liquid in the shunt conduit can alternatively be accomplished by other means, such as a manually operated or electrically actuated valve. Such an electrically actuated valve may be actuated, for example, in response to a predetermined liquid level in the recirculation tank, or by a timer.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of treating sewage wastewater, comprising:

(a) removing solids from said wastewater by gravitational separation;

(b) thereafter flowing said wastewater to a tank;

(c) flowing at least a portion of said wastewater from said tank to a filter comprised of filter media and thereafter flowing at least said portion through said media to produce a filtrate;

(d) sensing the amount of wastewater in said tank;

(e) returning a fraction, less than all but more than none, of said filtrate from said filter to said tank when the amount of wastewater sensed in step (d) is at least a predetermined amount; and (f) returning more than said fraction of said filtrate from said filter to said tank when the amount of wastewater sensed in step (d) is less than said predetermined amount by decreasing resistance to flow of said filtrate to said tank.

2. The method of claim 1 wherein step (e) further includes discharging a portion of said filtrate not included in said fraction by increasing resistance to flow of said filtrate to said tank.

3. The method of claim 1, wherein step (f) comprises returning all of said filtrate from said filter to said tank when the amount of wastewater sensed in step (d) is less than said predetermined amount.

4. A system operable for treating sewage wastewater, comprising:

(a) means for removing solids from said wastewater by gravitational separation;

(b) a tank for containing liquid therein, said tank having a tank outlet;

(c) a filter comprising filter media, said filter having a filter inlet and a filter outlet;

(d) a conduit interconnecting said tank outlet and said filter inlet for conducting liquid from said tank to said filter;

(e) a discharge conduit for discharging liquid from said system;

(f) a conduit assembly interconnecting said filter outlet and said discharge conduit for conducting liquid from said filter to said discharge conduit, said conduit assembly including a shunt conduit connected to said tank for shunting at least some liquid from said filter to said tank bypassing said discharge conduit; and (g) means for selectively varying resistance to flow of liquid in said shunt conduit, wherein said means (g) comprises means for decreasing said resistance to flow automatically in response to the amount of liquid in said tank being less than a predetermined amount.

\* \* \* \* \*